US012762152B2

(12) United States Patent
Paulson et al.

(10) Patent No.: US 12,762,152 B2
(45) Date of Patent: Oct. 13, 2026

(54) STRUCTURED AND UNSTRUCTURED DATA-DRIVEN CLASSIFICATION

(71) Applicant: N-Power Medicine, Inc., Redwood City, CA (US)

(72) Inventors: Joseph Nathaniel Paulson, San Francisco, CA (US); Nils Gustav Thomas Bengtsson, San Francisco, CA (US); Christer Svedman, Stockholm (SE)

(73) Assignee: N-Power Medicine, Inc., Redwood City, CA (US)

( * ) Notice: Subject to any disclaimer, the term of this patent is extended or adjusted under 35 U.S.C. 154(b) by 12 days.

(21) Appl. No.: 18/444,329

(22) Filed: Feb. 16, 2024

(65) Prior Publication Data

US 2025/0265271 A1 Aug. 21, 2025

(51) Int. Cl.
*G06F 16/28* (2019.01)

(52) U.S. Cl.
CPC .................................. *G06F 16/285* (2019.01)

(58) Field of Classification Search
CPC ..................................................... G06F 16/285
USPC ......................................................... 707/739
See application file for complete search history.

(56) References Cited

U.S. PATENT DOCUMENTS

2024/0220511 A1* 7/2024 Shukla .................. G06F 16/285

* cited by examiner

*Primary Examiner* — Tony Mahmoudi
*Assistant Examiner* — Nirav K Khakhar
(74) *Attorney, Agent, or Firm* — Pierson Ferdinand LLP; Daniel Rose

(57) ABSTRACT

In some aspects, the disclosure is directed to methods and systems for classification and selection of entities based on associated structured and unstructured data. Implementations leverage correlations and relationships between structured and unstructured data to generate metadata or structure for the unstructured data, and/or provide entity classification based on any and all associated structured and unstructured data.

20 Claims, 6 Drawing Sheets

STRUCTURED AND UNSTRUCTURED DATA-DRIVEN CLASSIFICATION

FIELD OF THE DISCLOSURE

This disclosure generally relates to systems and methods for data processing. In particular, this disclosure relates to systems and methods for classification and selection of entities based on associated structured and unstructured data.

BACKGROUND OF THE DISCLOSURE

Data may generally include structured data, or data containing an explicit structure or metadata, such as forms with associated field identifiers, extensible markup language (XML) data with associated tags, tables with column and/or row headers, parameter-value pairs or tuples, or other such data in which values have an identified syntax or format; and unstructured data, or data where such metadata or explicit structure or syntax is absent. For example, unstructured data may include alphanumeric data strings, descriptive notes, or other "free form" data. Both structured and unstructured data may be associated with an entity, such as a device, user, location, company, account, or other such signifier.

In some implementations, data associated with an entity or about the entity may be used for selecting or classifying the entity. For example, data about a computer server may be used to determine whether the device is properly working or is under a malicious network attack; data about patients may be used to classify or select them for clinical trial cohorts; data about computer accounts may be used to determine access control levels or authorization to make changes to the computer system; data about financial accounts may be used to determine whether an account should be subject to audit or review or whether transactions are suspicious; etc. However, in many such instances, classification of the entity may require sorting or scoring information about the entity. This may be easier in instances where all of the data is structured and subject to the same rigid rules and syntaxes (e.g. alphabetically sorting user names, or numerically sorting financial accounts based on their total value, etc.). However, where data is unstructured or freeform, or where there's a combination of unstructured and structured data, it may be difficult to properly classify or select entities. Accordingly, simple or naive implementations may ignore unstructured data when performing classification or analysis, which may lead to incorrect classifications or waste resources by requiring manual human review of any such data or associated entities.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

Figure 1A:
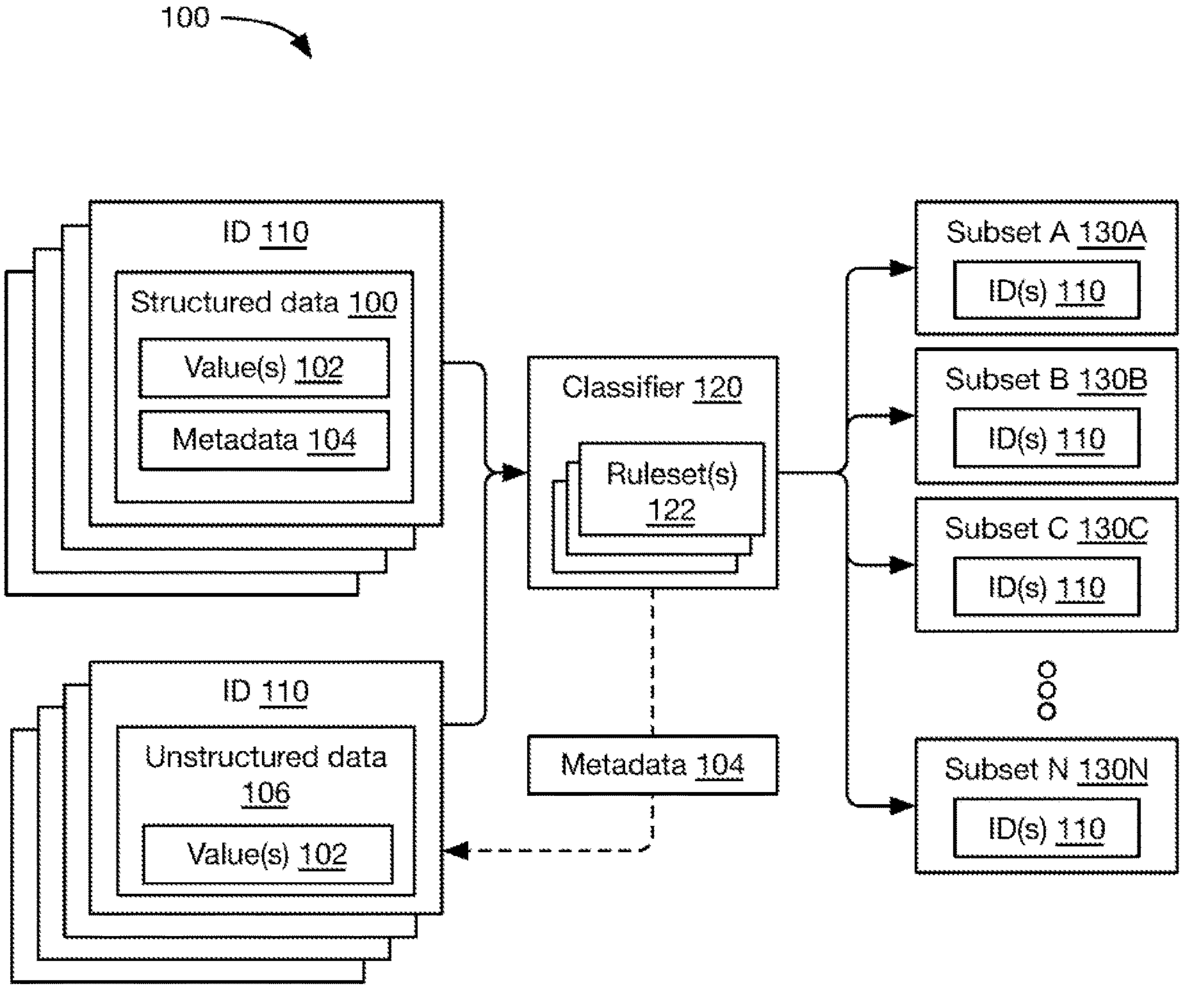
FIG. 1A is a block diagram of an implementation of a system for structured and unstructured data-driven classification.

The details of various embodiments of the methods and systems are set forth in the accompanying drawings and the description below.

DETAILED DESCRIPTION

For purposes of reading the description of the various embodiments below, the following descriptions of the sections of the specification and their respective contents may be helpful:

Section A describes embodiments of systems and methods for structured and unstructured data-driven classification; and Section B describes a computing environment which may be useful for practicing embodiments described herein.

A. Systems and Methods for Structured and Unstructured Data-Driven Classification Structured data may comprise containing an explicit structure or metadata, such as forms with associated field identifiers, extensible markup language (XML) data with associated tags, tables with column and/or row headers, parameter-value pairs or tuples, or other such data in which values have an identified syntax or format. In some instances, structured data may have an implicit structure, such as conformance to an accepted or typical syntax (e.g. calendar dates in mmddyyyy format, without explicitly identifying each number as corresponding to a month, day, or year, or currency values with a type indicator such as "$" or "£").

Unstructured data may include alphanumeric data strings, descriptive notes, or other "free form" data. For example, unstructured data may comprise text files, binary data, images, videos, audio recordings, or other such data. In many implementations, unstructured data may be scanned printed or handwritten documents with optical character recognition (OCR) data, which may fail to capture structure, labels, tags, or other identifiers. In some implementations, data that appears unstructured, such as a drawing, may have an underlying structure, such as a CAD file with explicit parameters for each point or line.

Data, both structured and unstructured, may be stored in any suitable format, including as flat files, databases, arrays, concatenated or delineated or separated strings, bitmaps, compressed data, encrypted data, etc. For example, data, both unstructured and structured, may be in a portable document format such as a PDF, an XML document, or any other type and form of document. For clarity, in many implementations, "data" may refer to the contents of a file or container rather than the file or container itself. For example, a PDF document may include a header that identifies the accompanying binary data as being in a PDF format, or an image document may include a header that identifies a type of image compression such as JPEG, GIF, or PNG and corresponding compression parameters; however, such metadata or header information describes the file or container rather than the data contents of the file, which may be text, images, alphanumeric strings, executable code, etc. or any other type of data, and may be structured or unstructured.

Both structured and unstructured data may be associated with an entity, such as a device, user, location, company, account, or other such signifier. In some implementations, this may be explicit, such as via an identifier of the entity in metadata, in a data field, or within the freeform unstructured data. In other implementations, this may be implicit, such as via file metadata or a location (e.g. within an entity-associated directory in a computer file system).

In some implementations, data associated with an entity or about the entity may be used for selecting or classifying the entity. For example, data about a computer server may be used to determine whether the device is properly working or is under a malicious network attack; data about patients may be used to classify or select them for clinical trial cohorts; data about computer accounts may be used to determine access control levels or authorization to make changes to the computer system; data about financial accounts may be used to determine whether an account should be subject to audit or review or whether transactions are suspicious; etc. However, in many such instances, classification of the entity may require sorting or scoring information about the entity. For example, with clinical data or data related to electronic health records, sorting or scoring information may require in-depth encoding and synthesis of clinical knowledge. For data related to logistics or shipping, sorting or scoring information may require knowledge of entities, container sizes, port capabilities, or other such information. Classification may be easier in instances where all of the data is structured and subject to the same rigid rules and syntaxes (e.g. alphabetically sorting user names, or numerically sorting financial accounts based on their total value, etc.). However, where data is unstructured or freeform, or where there's a combination of unstructured and structured data, it may be difficult to properly classify or select entities. For example, selecting patients for a pharmaceutical test cohort based on being under or over 30 years of age may be relatively trivial, based on structured patent data records or electronic health records (EHR) identifying the patients age or date of birth. Selecting the patients based on likely conformance to the test regimen based on a combination of structured and unstructured visit records, physician notes, location information, prescription refill data, etc., may be significantly more difficult, if not impossible using systems not implementing the methods and features discussed herein. Instead, simple or naive implementations may ignore the unstructured data when performing classification or analysis leading to incorrect classifications, or may require extensive and time-consuming human review of all unstructured data thereby making automation impossible and wasting valuable resources and time.

Instead, implementations of the systems and methods discussed herein leverage correlations and relationships between structured and unstructured data to generate metadata or structure for the unstructured data, and/or provide entity classification based on any and all associated structured and unstructured data. These data-driven classifications may be more accurate than naive systems, and may be significantly faster than systems that require human analysis, allowing for scalability and efficiency.

Referring first to FIG. 1A, illustrated is a block diagram of an implementation of a system 100 for structured and unstructured data-driven classification. In brief overview, a classifier 120, which may comprise a machine learning system executed by one or more computing devices, may use one or more rulesets 122 to process structured data 100 and unstructured data 106 in order to classify identifiers 110 associated with the data 100, 106 into one or more categories or subsets 130A-130N.

Still referring to FIGS. 1A and 1*n* more detail, as discussed above, data may include structured data 100 and unstructured data 106, together referred to generally as data, items of data, files, documentation, or by similar terms. Each of structured data and unstructured data may include one or more values 102, which may refer to individual values, strings, arrays, images, bitmaps, parameters, configurations, or other such objects. Values 102 may be of any size or length. In some implementations, for example, a paragraph of text may be considered to have dozens or hundreds of values (e.g. as individual sentences, words, or characters), while in other implementations, the text block (e.g. paragraph or paragraphs) may be considered a single extended value. These implementations may be mixed, with small and long values (e.g. fields with a fixed length in characters and others with variable length).

As discussed above, structured and unstructured data may be distinguished by metadata 104, which may comprise configurations, field identifiers, labels, tags, or other such information that characterizes, describes, defines, or otherwise provides a structure, syntax, grammar, or definition to a corresponding value. For example, metadata 104 may comprise a label for a field in which a value 102 is entered, such as a "user name" label or identifier and the corresponding user name, or an "account identifier" and a corresponding alphanumeric string. Metadata 104 may be of any type and form including text (e.g. printed labels on a form), machine readable code (e.g. XML tags, parameter labels for parameter-value pairs, header codes or other information, etc.), or other format, and may be visible to a user or invisible (e.g. not displayed or rendered). Unstructured data 106 may not necessarily (or originally) include metadata 104, but values 102 of unstructured data 106 may have a structure or syntax that is not specified. For example, a handwritten name on a document may be a user name, but not be explicitly identified as such. Accordingly, unstructured data 106 may have inherent or implicit metadata that is nonetheless unknown to the classifier 120 when initially ingested.

Structured and unstructured data 100, 106 may be associated with an identifier 110 representing an entity. Identifier 110, which may be referred to variously as a user ID, source ID, globally unique ID (GUID), account ID, patient ID, employee ID, company ID, manufacturer ID, device ID, or by any other such term, may represent a corresponding entity and indicate that the data 100, 106 is related to, owned by, created by, or describes that entity or its characteristics. Identifier 110 may not be unique to any particular set of data 100, 106. For example, an account identifier 110 may be associated with structured data 100 identifying an account owner or company, other structured data 100 representing transactions or account statements, unstructured data 106 representing meeting notes or purchased items, or any other such information. In another implementation, an account identifier 110 may be associated with a patient identifier, and may be associated with structured data 100 of patient vital statistics, historical records of medications or treatments, etc.; and unstructured data 106 of MRI or x-ray images and physician notes, patient journals, etc. In many implementations, data 100, 106 may be explicitly identified with identifier 110 (e.g. in a file title, in a header of the file, in metadata of the file, in notes attached to a file, etc.) or may be implicitly identified with identifier 110 (e.g. in a directory structure containing the data, such as a "users/userID/data.pdf" path). In some implementations, an identifier 110 may be absent, particularly for unstructured data 106, and a classifier 120 may be utilized to determine an appropriate identifier 110 for addition to or tagging of the data 106.

Classifier 120 may comprise a machine learning algorithm or system for classifying identifiers 110 into one or more subsets 130 based on structured data 100 and unstructured data 106 associated with the identifiers. For example, classifier 120 may comprise a trained neural network, a support vector machine (SVM), a k-Nearest Neighbor (k-NN) classifier, or any other type and form of machine learning system. For example, in some implementations, classifier 120 may comprise a decision tree, a recurrent neural network (RNN), such as a long short-term memory (LSTM) RNN, a hierarchical RNN, a convolutional neural network (CNN), etc. In some implementations, classifier 120 may utilize one or more rulesets 122, which may comprise machine learning models, hyperparameters, decision rules, cluster definitions, thresholds, or any other such configurations or parameters for classifying identifiers. As used herein, machine learning may also be referred to as artificial intelligence or AI, deep learning, or by similar terms.

As shown, identifiers 110 may be sorted or classified into one or more subsets 130A-130N, which may be referred to variously as clusters, buckets, pools, sets, groups, cohorts, or by similar terms. In some implementations, each identifier may be associated with a score, and each subset may be associated with a score threshold or range. For example, an identifier may be sorted into a first subset A if its score is equal to or less than a first threshold $t_A$, a second subset B if its score is greater than the first threshold $t_A$ but equal to or less than a second threshold $t_B$, etc. In a similar implementation, an identifier may be sorted into a subset if its score is equal to or greater than a first threshold, or discarded or excluded from the subsets if its score is less than the threshold. Thus, in some implementations, only a single subset or threshold may be utilized.

Figure 1B:
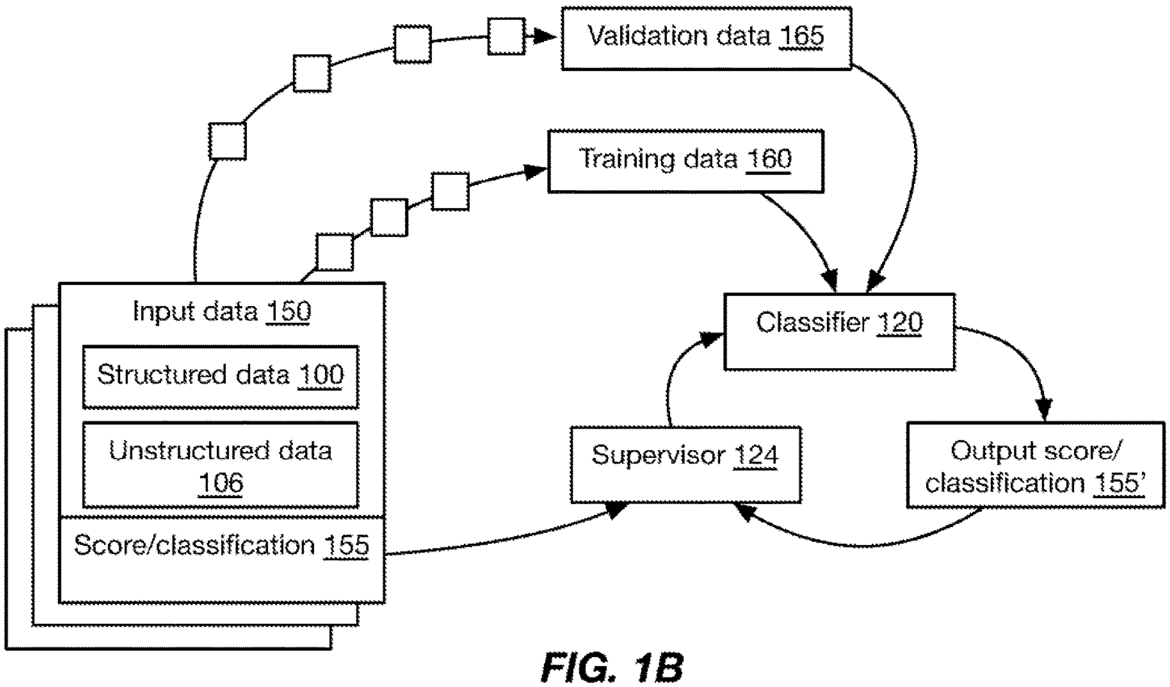
FIG. 1B is a block diagram of an implementation of training a machine learning system for structured and unstructured data-driven classification.

In some implementations, rulesets 122 (or models, hyperparameters, etc.) may be generated via a supervised learning process, with classifications or scores applied to training data (comprising structured and unstructured data) by an administrator or developer of the system. For example, FIG. 1B is a block diagram of an implementation of training a machine learning system for structured and unstructured data-driven classification. As shown, input data 150, comprising structured data 100 and unstructured data 106 may be associated with an input score or classification 155. In some implementations, all or part of this data 100, 106 may be provided as training data 160 to classifier 120, which may generate an output score or classification 155' (e.g. classifying the identifiers associated with the input data 100, 106 into corresponding subsets). Training data and input scores may be generated by a user, developer, or administrator in some implementations, or may be generated via an unsupervised learning algorithm in some implementations and provided to the supervised learning algorithm for refinement or optimization. In some implementations, training data may come from multiple sources: human entered data, machine learning-generated data, or a combination of these or other sources.

A supervisor 124, which may comprise a recursive portion of classifier 120 in many implementations, may modify parameters, models, or rulesets 122 to correct accuracy of output score or classification 155' based on the predetermined or input score or classification 155. This may be done iteratively on the training data 160 until accuracy (or specificity or sensitivity, depending on implementation) exceeds a threshold. In some implementations, to avoid overfitting, another portion of input data 150 may be utilized as verification or validation data 165. That is, once the model is trained, the validation data 165 and its associated scores or classifications 155 may be used to determine whether the model is globally applicable (e.g. whether accuracy degrades when data other than the specific training data 160 is analyzed).

In other implementations, training may be performed using orthogonal data sets, either manufactured or selected from input data sets. In still other implementations, classifier 120 may be pre-trained on other types of data. For example, classifier 120 may be trained on identifying correlations in financial data, and then be used to classify electronic health records or logistics records. While initial accuracy may suffer in many implementations, recursive supervised or unsupervised learning and/or retraining on new data may both improve accuracy and increase generalization of the classifier. In still other implementations, training may be performed using unstructured data to which structure has been manually added (e.g. annotations, labels, etc.). In various implementations, combinations of these or other training methods may be utilized.

Returning briefly to FIG. 1A, in some implementations, classifier 120 may generate or identify metadata 104 for values 102 of unstructured data 106. For example, in some implementations, where structured data 100 and unstructured data 106 have the same identifier 110, classifier 120 may identify correlations between values of unstructured data 106 and values of structured data 100 and add corresponding metadata 104 to the unstructured data 106. For instance, a structured data value may be an alphanumeric account identifier with a particular syntax such as "aaaaaaann" (with 'a' representing letters and 'n' representing numbers, such as "1234567ab"), and a similar or the same alphanumeric string may appear in the unstructured data (e.g. "2345678cd"). The classifier 120 may identify the latter as potentially being an account identifier, based on the metadata associated with the correlated value in the structured data. Accordingly, in some implementations, the classifier 120 may identify and add metadata to the unstructured data, thereby creating structured data (at least, for the purposes of subsequent processing). In some implementations, this feature may be provided by a different machine learning system. For example, in some implementations, classification of identifiers into subsets may be performed by a first machine learning system, such as a k-NN classifier or decision tree, and correlation and addition of metadata may be performed by a second machine learning system, such as an RNN.

Figure 1C:
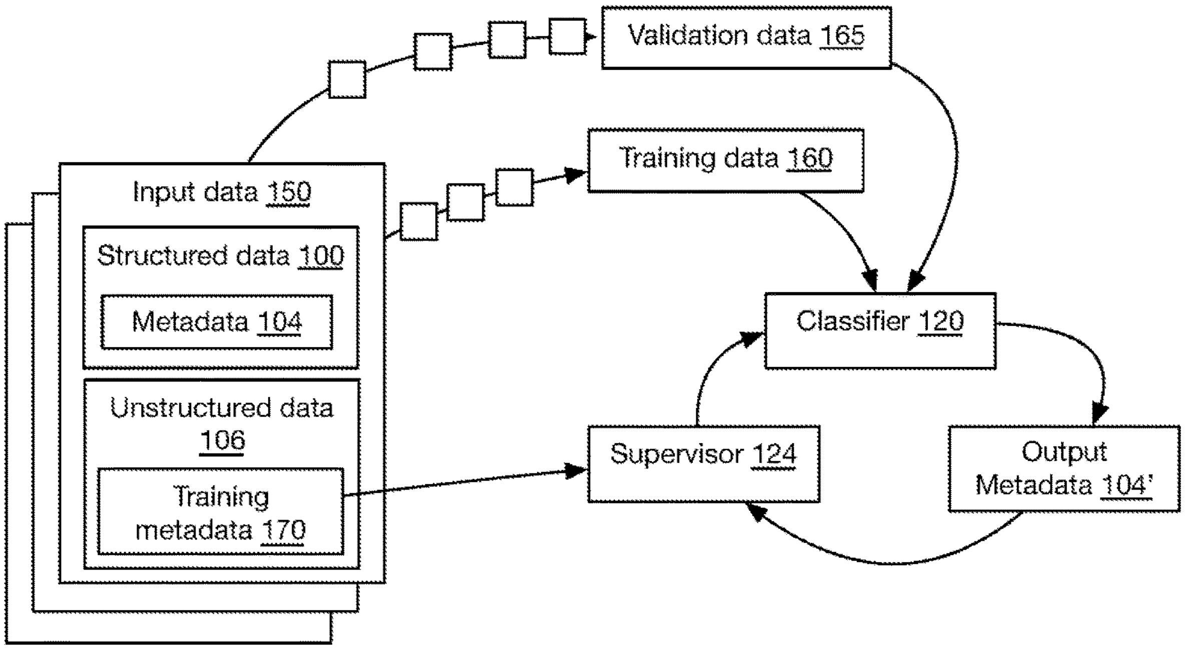
FIG. 1C is a block diagram of an implementation of training a machine learning system for providing structure to unstructured data.

FIG. 1C is a block diagram of an implementation of training a machine learning system for providing structure to unstructured data. Similar to the implementation of FIG. 1B, a classifier 120, along with a supervisor 124 or other recursion algorithm, may use subsets of input data 150 (e.g. training data 160, validation data 165) to train classifier 120 to identify or generate metadata 104' for unstructured data 106, using the metadata 104 of associated structured data 100 as a guide. For example, in some such implementations, classifier 120 may comprise a neural network trained on inputs of structured data 100, metadata 104, and unstructured data 106 to select metadata for the unstructured data from a predetermined set of metadata 104' (e.g. named fields, such as "user name", "account ID", "date", "address", "transaction ID", "total value", etc.) with each corresponding to an output neuron, and recursion based on training metadata 170 for the unstructured data selected by an administrator or developer. In other implementations, training metadata 170 may be absent, and the classifier may be trained just on structured data 100 and metadata 104. Such a trained model may be less accurate for unstructured data 106, but may be adequate for some needs (and may be highly accurate with certain values or data types with strict syntax, such as account identifiers or dates).

Figure 2:
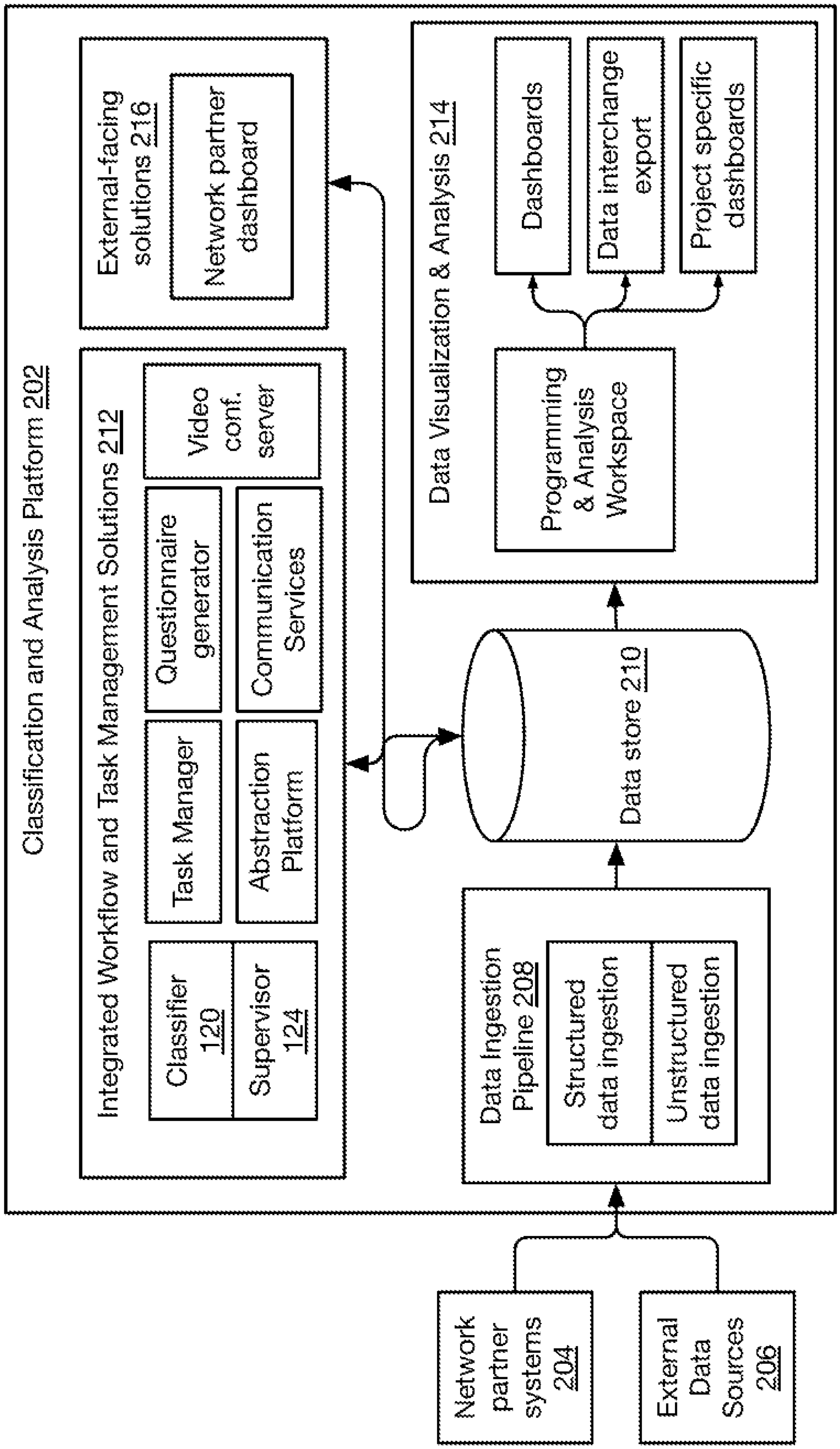
FIG. 2 is a block diagram of an implementation of a system for structured and unstructured data-driven classification.

In some implementations, the classifier 120 may be part of a larger system or computing environment. For example, FIG. 2 is a block diagram of an implementation of a system for structured and unstructured data-driven classification. The system may comprise a classification and analysis platform 202, which may be executed by one or more computing devices. For example, the platform 202 may be provided as a software-as-a-service environment by one or more virtual machines executed by one or more physical machines (e.g. as part of a server cloud or cluster). Although shown as a single unit, functions of platform 202 may be distributed across a large number of computing devices or services, which may be geographically co-located or separated. This may provide scalability and efficiency, particularly where different functionality is needed in different locations (e.g. document ingestion vs. storage vs. output or analysis).

Platform 202 may comprise a data ingestion pipeline 208 for receiving and ingesting structured and unstructured data from network partner systems 204 and/or external data sources 206. For example, in some implementations, partner systems 204 may comprise financial transaction servers, electronic health record (EHR) servers, enterprise resource planning (ERP) servers, or any other such computing systems that may provide structured and/or unstructured data. In some implementations, external data sources 206 may comprise document scanners, imaging devices, point of sale terminals, automatic teller machines, portable user devices such as smart phones or wearable devices, or other network services. The ingestion pipeline 208 may comprise an application, daemon, service, server, or other executable logic for receiving or retrieving data from partner systems 204 and/or external data sources 206 (including any required authentication or handshaking protocols, in some implementations); and parsing or pre-processing the data for analysis and classification. For example, in some implementations, ingestion pipeline 208 may perform optical character recognition on scanned documents, may convert data to a standard format (e.g. decrypting or decompressing data, normalizing or transcoding values from systems with different scales, etc.). For another example, in some implementations, structured data received from partner systems may be in different standard formats (e.g. mmddyyyy formats for dates from one partner and yyyymmdd formats from another, concatenated lastnamefirstname fields vs. separate last name and first name fields, Imperial measurements to metric, etc.). Ingestion pipeline 208 may perform syntax translations (e.g. by applying regular expression (RegEx) matching or parsing according to predetermined rules, etc.) such that the output structured data is all in a similar format for classification. For example, in one such implementation, structured data may be transcoded to comply with a health level 7 Consolidated Clinical Document Architecture (HL7 C-CDA) standard, or other predetermined syntax or schema. In some implementations, ingesting the data may comprise storing it to a data store 210 according to a particular directory structure (e.g. based on user or device identifiers, account identifiers, partner provider identifier, etc.). In some implementations, data may be ingested or received from inputs provided by entities (users, developers, administrators, physicians, accountants, etc.) filling out questionnaires (discussed in more detail below) or completing forms or checklists. For example, in some implementations, a user may interpret unstructured data, notes, etc., and may generate corresponding structured data. Ingestion of data may be periodic or continuous. For example, in some implementations, data may be received and ingested in real time. In other implementations, data may be retrieved and ingested in periodic batches, such as every 15 minutes, every hour, or every day.

Integrated workflow and task management solutions 212 (generally referred to as workflow solutions 212) may comprise one or more modules, each of which may be a separate application, service, server, daemon, routine, or other executable logic, or may be part of one or more applications or logic providing different functionality. For example, classifier 120 (and in some implementations, supervisor 124 or recursive learning components of a machine learning system) may be provided by workflow solutions 212. In some implementations, workflow solutions 212 may comprise an abstraction platform for providing structure to unstructured data based on correlations with structured data or other metadata, or based on input data, labels, or other fields, as discussed above in connection with FIGS. 1A-1C. For example, the abstraction platform may comprise classifier 120, or may comprise a separate machine learning system.

Workflow solutions 212 may also comprise a task manager, which may comprise a service, application, server, daemon, routine, or other executable logic for scheduling processing or analysis and, in some implementations, distributing analysis among a plurality of computing devices or servers and/or devices associated with users or administrators. For example, when classifying a large amount of data, in some implementations, task manager may subdivide the data and provide subsets to different application servers, each executing a classifier 120, for parallel analysis. This may increase efficiency and scalability.

In some implementations, workflow solutions 212 may comprise a questionnaire generator. In some instances, discussed in more detail below, additional data may be needed for proper classification. In some such implementations, a questionnaire generator may comprise an application, service, routine, or other executable logic for generating a request for specific data (e.g. including a data type, range, or any other such parameters). Communication services, including mail servers, web servers, application servers, video conference servers, etc., may be used to provide the questionnaire to a data source, such as an end user, physician, customer service representative, partner computing system, etc.

In some implementations, platform 202 may comprise a data visualization and analysis module 214, referred to generally as a visualization module 214. Visualization module may comprise an application, server, service, routine, or other executable logic for generating and providing reports or outputs of classification or other analysis, including monitoring of task management, ingestion pipelines, etc. For example, in some implementations, visualization module may provide a user interface (e.g. graphical user interface or command line interface) for receiving reports on system performance, classification details or classified identifiers (e.g. the contents of various classified subsets of entity identifiers, etc.), percentages of classified vs. unclassified data sets or entities, etc. These may be presented in visual dashboards or project specific dashboards, output or exported for use in other systems (e.g. as a relational database, flat file, array, or other suitable data format), etc.

Similar, in some implementations, platform 202 may comprise an application, service, server, routine, or other executable logic for providing external-facing solutions such as reports, dashboards, or other graphical user interfaces or non-graphical interfaces or data. Similar to dashboards provided by data visualization and analysis module 214, in some implementations, external-facing dashboards may be formatted for external users or partners where data access may be limited due to policy reasons. For example, in some implementations, an external-facing dashboard may have input data stripped of personally identifiable information (PII) such as user names or locations, etc. The external-facing solutions 216 may accordingly provide anonymization functions, including data aggregation or obfuscation (e.g. creating "shadow" entities that are statistically similar to real entities associated with structured and unstructured data, but with artificial or randomized identifiable information, etc.). This may be particularly important for implementations related to medical records or financial records.

Figure 3:
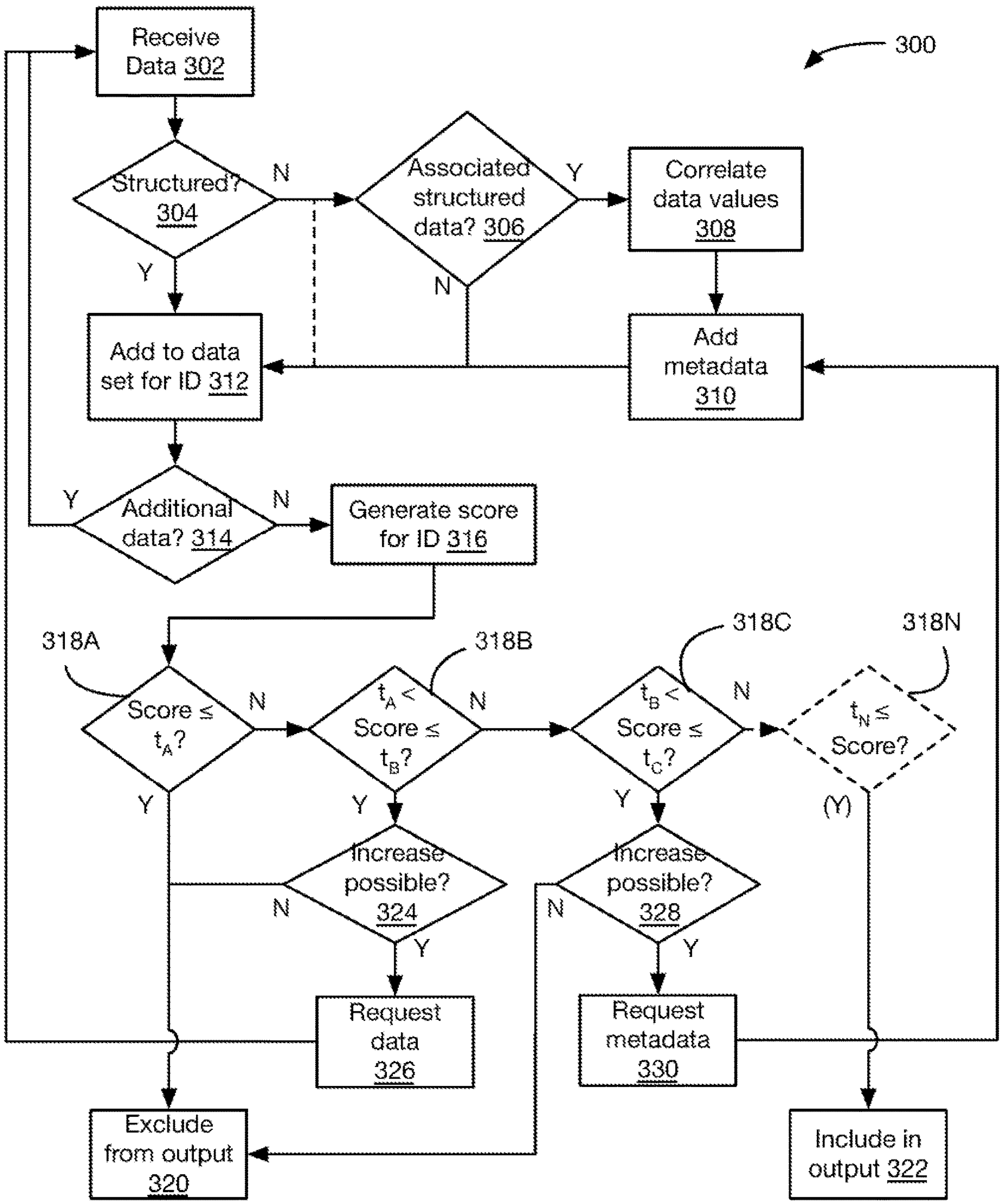
FIG. 3 is a flow chart of an implementation of a method for structured and unstructured data-driven classification.

FIG. 3 is a flow chart of an implementation of a method 300 for structured and unstructured data-driven classification. At step 302, a computing system or systems executing a classifier (or classifiers) may receive data. The data may be received via an input device, such as a document scanner, camera, facsimile machine, keyboard, microphone, etc.; may be received via a network connection from another computing device, storage device, application server, partner server, etc.; and/or may be received from a storage device or memory device, such as a hard drive, flash drive, CD/DVD-ROM or BluRay Disc, or other such device. In some implementations, the data may be received in response to a request for data, or may be "pulled" or retrieved from the other device. In other implementations, the data may be provided or "pushed" by the other device. As discussed above, in some implementations, data may be received or retrieved in real-time (for example, as data is created, it may be transmitted or provided to the classifier or computing system); or may be received or retrieved periodically (e.g. every 5 minutes, 10 minutes, 15 minutes, hourly, daily, weekly, etc.). In many implementations, the data may be explicitly or implicitly associated with an entity identifier (e.g. user ID, patient ID, account ID, device ID, GUID, or other such identifier). In some implementations, the system may perform pre-processing on the data, such as performing OCR analysis, filtering the data (e.g. identifying if the data matches a RegEx or similar expression, and accordingly transcoding, translating, discarding, or otherwise processing the data), normalizing the data, scaling the data, decrypting and/or decompressing the data, etc.

At step 304, the classifier or computing system may determine whether a first item of data (e.g. document, file, record, etc.) comprises structured or unstructured data. In some implementations, the classifier or computing system may determine whether the first item of data includes metadata or is associated with metadata (e.g. tags, labels, header information, identified fields, parameters, or any other explicit or implicit structure). In some implementations, the classifier may parse or scan the data for metadata or other identifiers of structure, e.g. via a RegEx or similar parser. If the data is structured, in some implementations, then at step 312, the structured data item may be added to a set of data for the entity identifier.

If the data is not associated with a structure, in some implementations, at step 306, the classifier or system may determine whether there is associated structured data that may be used for adding metadata or structure to the unstructured data. For example, the system or classifier may search a local data store or database, or data set to which other data associated with the same entity identifier has been added at step 312. In other implementations, the system or classifier may request or retrieve structured data for the entity identifier from external sources, such as storage devices, network servers, etc. At step 308, in some implementations, the system or classifier may identify metadata to be associated with the unstructured data, e.g. by correlating or analyzing structured data associated with the same entity identifier and corresponding metadata (e.g. via a machine learning system, as discussed above). In some implementations, at step 310, selected or identified metadata may be added to or associated with the unstructured data, thereby making structured data (at least for the purpose of further processing). In some implementations, the metadata may only be added if the classifier selects or identifies the metadata with a confidence score or value above a threshold. For example, in some implementations, a neural network executed by the classifier may generate different confidence scores for each of a plurality of metadata to be associated with the unstructured data. A highest confidence scoring metadata may be added to or associated with the unstructured data at 310 (in some implementations, only if the confidence score exceeds a threshold). The unstructured data, with associated or added metadata, may be added to a data set for the entity identifier at step 312. In other implementations (shown in dashed line), steps 306-310 may be skipped. Similarly, if no associated structured data is identified at step 306, steps 308-310 may be skipped.

At step 314, the system or classifier may determine if additional data is to be ingested or received. If so, steps 302-312 may be repeated for each additional item of data.

Once all data to be processed has been received, in some implementations, at step 316, the system or classifier may generate a score or a classification for an entity identifier. As discussed above, the system or classifier may use structured and unstructured data associated with a given identifier to select or classify a subset, bucket, or similar grouping with which the entity identifier should be associated. For example, in some implementations, a decision tree may be applied to the structured and unstructured data to generate a score (e.g. +5 points for every physician visit identified in a record, +10 for each visit within a predetermined time period such as a month, −5 points if location from a clinical trial testing center is greater than 50 miles, −20 points if an associated diagnosis has not been made, etc., for example in implementations associated with clinical trial cohort selection). In other implementations, a confidence score may be generated for each subset or group and the entity identifier may be associated with the highest scoring subset or group. The scores may be aggregated in such implementations, or a highest score used.

In some implementations, scores for an entity identifier may be increased or decreased or otherwise adjusted based on a ratio of structured data to unstructured data associated with the unique identifier. For example, in some implementations, structured data may be more credible or trustworthy, and a score for classifying the entity identifier may be increased based on a ratio of structured to unstructured data exceeding a threshold. In a similar implementation, a score for an entity identifier may be increased or incremented based on a number of items of structured data associated with the entity, or decreased or decremented based on a number of items of unstructured data associated with the unique identifier. In still another implementation, metadata associated with each value of structured data may have an associated intermediate score (e.g. +5 for each date, +10 for each transaction value, etc.), and a score for an entity identifier may be determined by aggregating the scores associated with the metadata of structured data. In such implementations, metadata may be added to unstructured data, as discussed above, and intermediate scores for such unstructured data with included metadata may be included during aggregation.

In implementations in which a score is generated for an entity identifier, at step 318A, the system or classifier may determine whether it is equal to or below a first threshold $t_A$. If so then at step 320 in some implementations, the entity identifier may be added to a first subset and/or excluded from an output set (e.g. a set of patient identifiers for inclusion in a clinical trial of a pharmaceutical or procedure). If the score is greater than the first threshold, then in some implementations, the system or classifier may determine whether the score exceeds a second threshold $t_N$ at step 318N. If so, then at step 322, the entity identifier may be included in a second subset or included in an output set (e.g. identifiers of patients to be recommended to the clinical trial).

In some implementations, in addition to inclusion and exclusion thresholds $t_A$ and $t_N$ discussed above, intermediate thresholds or ranges between thresholds may be utilized in which additional metadata or data may be sought before the system makes a final determination of exclusion or inclusion (or inclusion in either the first subset or second subset). For example, in some such implementations at 318B, if the determined score is greater than a first threshold $t_A$ and equal to or less than a second threshold $t_B$, the classifier or system may determine at step 324 whether an increase in the score is possible through the addition of additional data (which may or may not have been already generated). For example, in some implementations, a system may initially look at 12 months of records for an entity and determine, based on those records and the systems and methods discussed herein, that while the entity should not be included in a first subset, it is possible that the entity could be included in a second subset, provided additional data increases the determined score for the entity identifier (e.g. data from a 13th month of records. For example, in some such implementations, a patient may be initially excluded for a clinical trial based on 6 months of investigation and monitoring. However, in some implementations, the patient's situation may change (e.g. due to a subsequent additional scan or physician visit, new blood work, etc.), and upon retrieval of receipt of updated data (e.g. new electronic records, etc.), the system or classifier may re-score the entity. In some instances, the new data may result in a score change such that the entity identifier is re-classified to a second subset (e.g. for inclusion in the output data set). Accordingly, the system need not be limited to presently obtained and analyzed data, but may proactively identify and request additional data that, if it exists, may cause a scoring value or classification to change. In some implementations, requesting additional data may comprise generating a questionnaire or other form with identified data (e.g. identified by metadata) to be provided. If the score cannot change, then at step 320, the entity identifier may be excluded from an output set or the identifier may be associated with an entity not included in the output set.

Similarly, in some implementations, at step 318C, if the determined score is greater than a second threshold $t_N$ and equal to or less than a third threshold (e.g. $t_C$ or $t_N$), the classifier or system may determine at step 328 whether an increase in the score is possible through the addition of metadata to unstructured data. For example, in some implementations, a score may be incremented with a first value for unstructured data and a second value for structured data. For example, a score for an entity identifier may be increased by 5 points for each associated unstructured data value, and 10 points for each associated structured data value. The system or classifier may determine that, should the score for the entity identifier be increased by less than 5 points, the classification or inclusion in an output data set of the entity identifier would change. If so, at step 330, the system or classifier may request metadata to be associated with the unstructured data. In some implementations, such requested metadata may be provided by the user, a physician, account agent, or other such person. In some implementations, requested metadata may be provided a classifier or neural network, scoring and selecting metadata based on correlations between the unstructured and structured data or based on a model trained to predict or select metadata for unstructured data, as discussed above in connection with FIGS. 1A-1C. If additional metadata would not change a classification or score, then at step 320, the entity identifier may be excluded from output data, or may be included in a first subset of data.

Steps 316-322 may be performed iteratively for each additional entity identifier included in structured or unstructured data, may be performed in parallel (e.g. by different virtual computing devices in a cloud environment) for different entity identifiers, or both iteratively and in parallel (e.g. with different subsets of data), in various implementations.

Accordingly, implementations of the systems and methods discussed herein leverage correlations and relationships between structured and unstructured data to generate metadata or structure for the unstructured data, and/or provide entity classification based on any and all associated structured and unstructured data. For example, in some implementations, the system may be used to sort or classify patients for inclusion or exclusion from a clinical trial. The various data and metadata that may be important to such a classification may include age, gender, diagnosis, stage of illness (e.g. type 2 vs. type 3 cancel), likelihood of conformance to a testing protocol, proximity to a testing center, potential allergies, white blood cell count or other vital information, etc. By using structured and unstructured data, the system or classifier may better sort or select entities or patients for inclusion or exclusion, with higher accuracy than implementations that fail to consider unstructured data or treat all data, structured and unstructured, identically.

In a first aspect, the present disclosure is directed to a method for unstructured and structured data-driven classification. The method includes receiving, by a computer system, a first set of structured data comprising a plurality of data values having corresponding metadata, and a second set of unstructured data comprising a second plurality of data values lacking corresponding metadata, wherein one or more data values of the first set of structured data and one or more data values of the second set of unstructured data are associated with the same unique identifier of a plurality of unique identifiers. The method also includes determining, by the computer system, a score for each unique identifier based on the associated structured data and unstructured data. The method also includes classifying, by the computer system, each unique identifier as belonging to (i) a first subset based on the respective score being below a first threshold, (ii) a second subset based on the respective score being above the first threshold and below a second threshold, or (iii) a third subset based on the respective score being above the second threshold.

In some implementations, the method includes associating, by the computer system, one or more data values of the second set of unstructured data with metadata based on a correlation between said data value, the associated unique identifier, and one or more data values and metadata of the first set of structured data also associated with the unique identifier. In a further implementation, the one or more data values of the second set of unstructured data associated with metadata are considered structured data while determining the score for each unique identifier. In another further implementation, associating the one or more data values of the second set of unstructured data with metadata includes selecting corresponding metadata, by a machine learning engine executed by the computer system, the machine learning engine trained on structured data and associated metadata.

In some implementations, the method includes, for each unique identifier classified as belonging to the second subset, identifying a modification to the associated structured or unstructured data that would increase the score to above the second threshold. In a further implementation, a first unique identifier is classified as belonging to the second subset; and the method includes identifying, by the computer system, that associating a first item of unstructured data with metadata would increase the score for the first unique identifier to above the second threshold.

In some implementations, the method includes determining a score for each unique identifier based on the associated structured data and unstructured data by adjusting the score proportional to a ratio of structured data to unstructured data associated with the unique identifier. In some implementations, the method includes determining a score for each unique identifier based on the associated structured data and unstructured data by incrementing the score based on a number of items of structured data associated with the unique identifier, or decrementing the score based on a number of items of unstructured data associated with the unique identifier.

In some implementations, the method includes the metadata comprises an intermediate score, and determining a score for each unique identifier further includes aggregating the intermediate scores of the metadata of the structured data associated with the unique identifier. In a further implementation, a first intermediate score of a first metadata of structured data is different from a second intermediate score of a second metadata of structured data.

In another aspect, the present disclosure is directed to a system for unstructured and structured data-driven classification. The system includes a computer system comprising one or more processors and one or more memory devices. The one or more processors are configured to retrieve, from the one or more memory devices, a first set of structured data comprising a plurality of data values having corresponding metadata, and a second set of unstructured data comprising a second plurality of data values lacking corresponding metadata, wherein one or more data values of the first set of structured data and one or more data values of the second set of unstructured data are associated with the same unique identifier of a plurality of unique identifiers. The one or more processors are also configured to determine a score for each unique identifier based on the associated structured data and unstructured data. The one or more processors are also configured to classify each unique identifier as belonging to (i) a first subset based on the respective score being below a first threshold, (ii) a second subset based on the respective score being above the first threshold and below a second threshold, or (iii) a third subset based on the respective score being above the second threshold.

In some implementations, the one or more processors are further configured to associate one or more data values of the second set of unstructured data with metadata based on a correlation between said data value, the associated unique identifier, and one or more data values and metadata of the first set of structured data also associated with the unique identifier. In a further implementation, the one or more data values of the second set of unstructured data associated with metadata are considered structured data while determining the score for each unique identifier. In another further implementation, the one or more processors are further configured to execute a machine learning engine trained on structured data and associated metadata to select corresponding metadata to associate with the one or more data values of the second set of unstructured data.

In some implementations, the one or more processors are further configured to, for each unique identifier classified as belonging to the second subset, identify a modification to the associated structured or unstructured data that would increase the score to above the second threshold. In a further implementation, a first unique identifier is classified as belonging to the second subset; and the one or more processors are further configured to identify that associating a first item of unstructured data with metadata would increase the score for the first unique identifier to above the second threshold.

In some implementations, the one or more processors are further configured to adjust the score proportional to a ratio of structured data to unstructured data associated with the unique identifier. In some implementations, the one or more processors are further configured to increment the score based on a number of items of structured data associated with the unique identifier, or decrement the score based on a number of items of unstructured data associated with the unique identifier. In some implementations, the metadata comprises an intermediate score, and the one or more processors are further configured to aggregate the intermediate scores of the metadata of the structured data associated with the unique identifier. In a further implementation, a first intermediate score of a first metadata of structured data is different from a second intermediate score of a second metadata of structured data.

B. Computing Environment

Having discussed specific embodiments of the present solution, it may be helpful to describe aspects of the operating environment as well as associated system components (e.g., hardware elements) in connection with the methods and systems described herein.

Figure 4A:
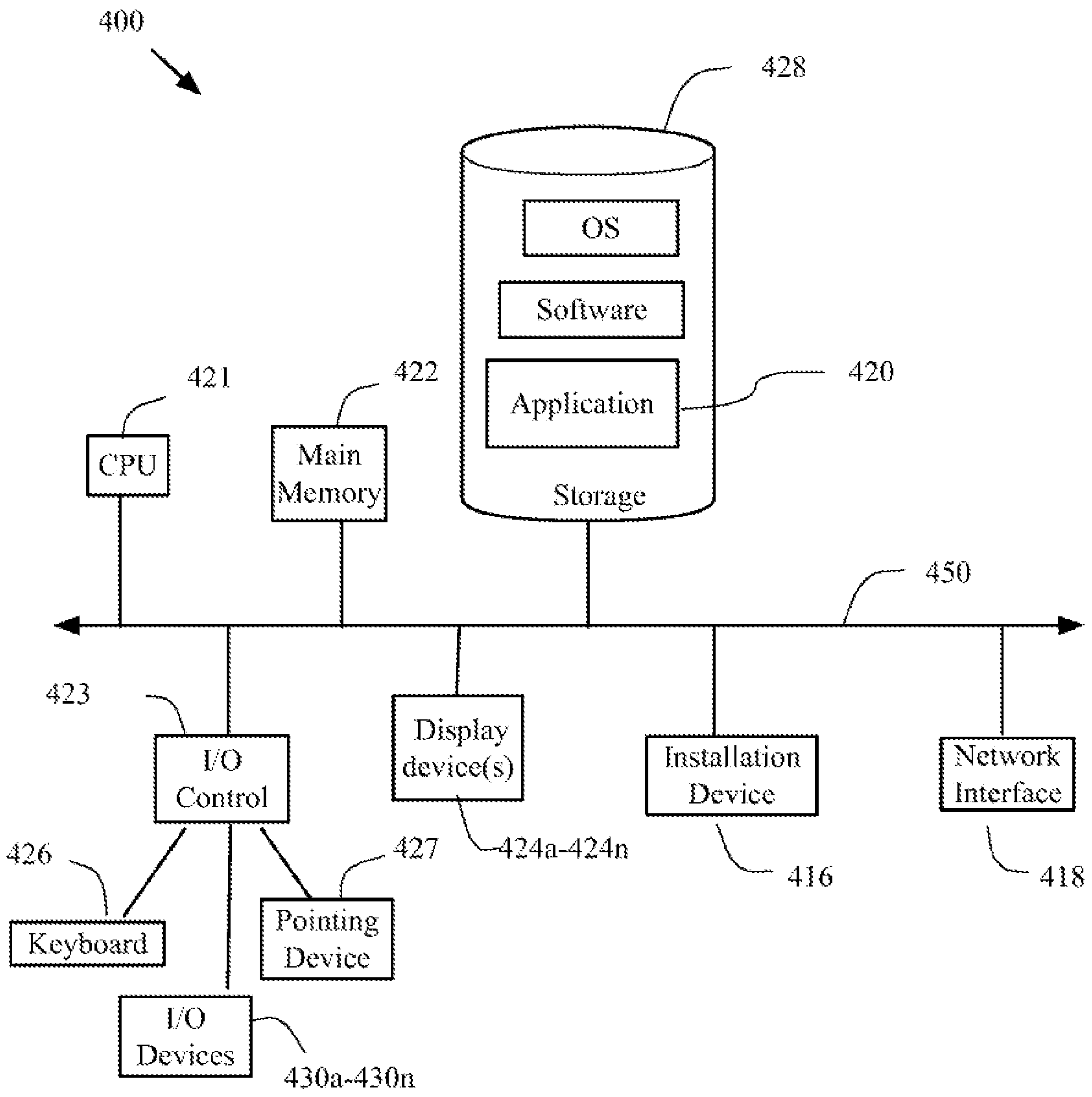
FIGS. 4A and 4B are block diagrams depicting embodiments of computing devices useful in connection with the methods and systems described herein.
Figure 4B:
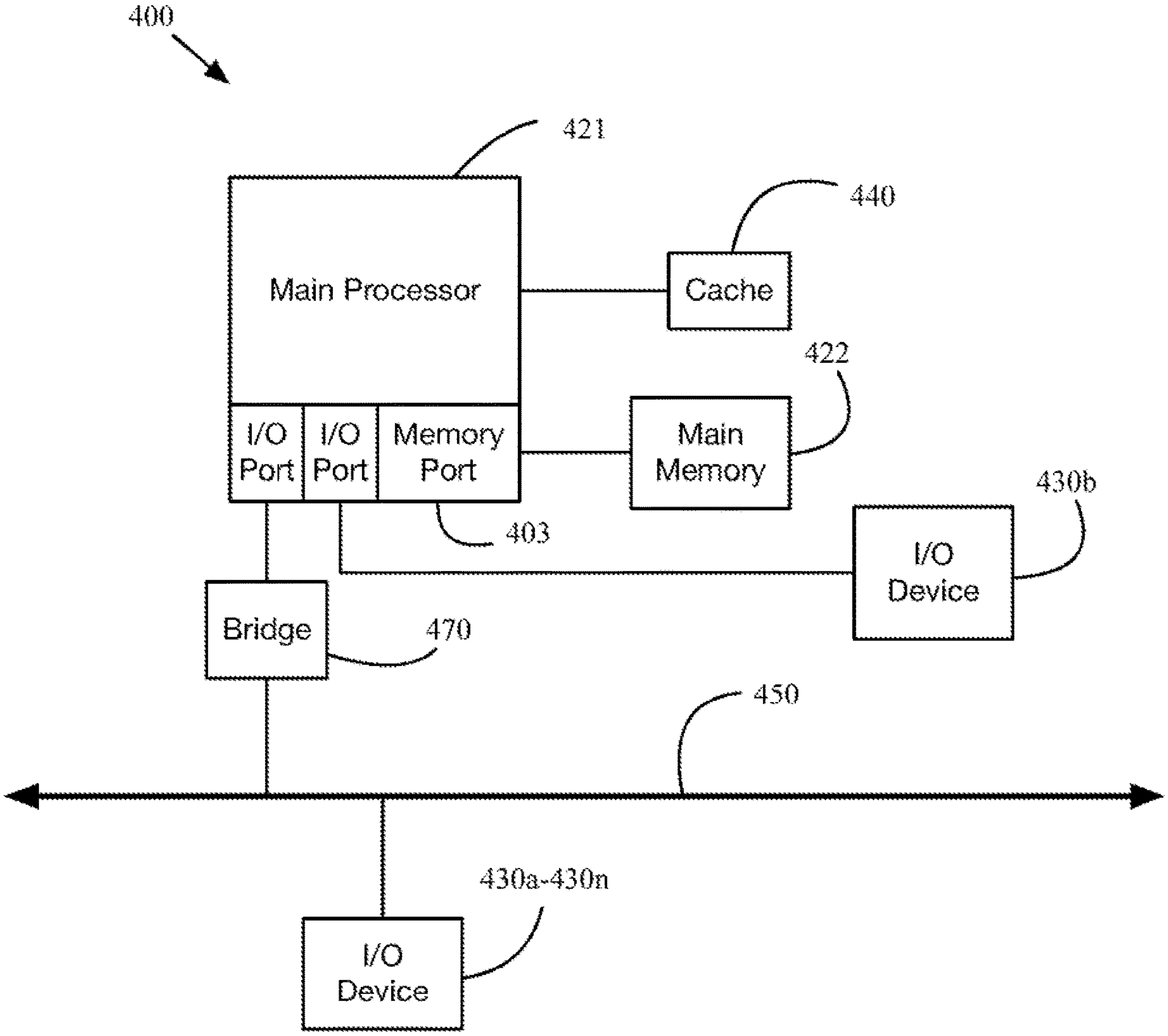

The systems discussed herein may be deployed as and/or executed on any type and form of computing device, such as a computer, network device or appliance capable of communicating on any type and form of network and performing the operations described herein. FIGS. 4A and 4B depict block diagrams of a computing device 400 useful for practicing an embodiment of the wireless communication devices 402 or the access point 406. As shown in FIGS. 4A and 4B, each computing device 400 includes a central processing unit 421, and a main memory unit 422. As shown in FIG. 4A, a computing device 400 may include a storage device 428, an installation device 416, a network interface 418, an I/O controller 423, display devices 424*a*-424*n*, a keyboard 426 and a pointing device 427, such as a mouse. The storage device 428 may include, without limitation, an operating system and/or software. As shown in FIG. 4B, each computing device 400 may also include additional optional elements, such as a memory port 403, a bridge 470, one or more input/output devices 430*a*-430*n* (generally referred to using reference numeral 430), and a cache memory 440 in communication with the central processing unit 421.

The central processing unit 421 is any logic circuitry that responds to and processes instructions fetched from the main memory unit 422. In many embodiments, the central processing unit 421 is provided by a microprocessor unit, such as: those manufactured by Intel Corporation of Mountain View, California; those manufactured by International Business Machines of White Plains, New York; or those manufactured by Advanced Micro Devices of Sunnyvale, California. The computing device 400 may be based on any of these processors, or any other processor capable of operating as described herein.

Main memory unit 422 may be one or more memory chips capable of storing data and allowing any storage location to be directly accessed by the microprocessor 421, such as any type or variant of Static random access memory (SRAM), Dynamic random access memory (DRAM), Ferroelectric RAM (FRAM), NAND Flash, NOR Flash and Solid State Drives (SSD). The main memory 422 may be based on any of the above described memory chips, or any other available memory chips capable of operating as described herein. In the embodiment shown in FIG. 4A, the processor 421 communicates with main memory 422 via a system bus 450 (described in more detail below). FIG. 4B depicts an embodiment of a computing device 400 in which the processor communicates directly with main memory 422 via a memory port 403. For example, in FIG. 4B the main memory 422 may be DRDRAM.

FIG. 4B depicts an embodiment in which the main processor 421 communicates directly with cache memory 440 via a secondary bus, sometimes referred to as a backside bus. In other embodiments, the main processor 421 communicates with cache memory 440 using the system bus 450. Cache memory 440 typically has a faster response time than main memory 422 and is provided by, for example, SRAM, BSRAM, or EDRAM. In the embodiment shown in FIG. 4B, the processor 421 communicates with various I/O devices 430 via a local system bus 450. Various buses may be used to connect the central processing unit 421 to any of the I/O devices 430, for example, a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 424, the processor 421 may use an Advanced Graphics Port (AGP) to communicate with the display 424. FIG. 4B depicts an embodiment of a computer 400 in which the main processor 421 may communicate directly with I/O device 430*b*, for example via HYPERTRANSPORT, RAPIDIO, or INFINIBAND communications technology. FIG. 4B also depicts an embodiment in which local busses and direct communication are mixed: the processor 421 communicates with I/O device 430*a* using a local interconnect bus while communicating with I/O device 430*b* directly.

A wide variety of I/O devices 430*a*-430*n* may be present in the computing device 400. Input devices include keyboards, mice, trackpads, trackballs, microphones, dials, touch pads, touch screen, and drawing tablets. Output devices include video displays, speakers, inkjet printers, laser printers, projectors and dye-sublimation printers. The I/O devices may be controlled by an I/O controller 423 as shown in FIG. 4A. The I/O controller may control one or more I/O devices such as a keyboard 426 and a pointing device 427, e.g., a mouse or optical pen. Furthermore, an I/O device may also provide storage and/or an installation medium 416 for the computing device 400. In still other embodiments, the computing device 400 may provide USB connections (not shown) to receive handheld USB storage devices such as the USB Flash Drive line of devices manufactured by Twintech Industry, Inc. of Los Alamitos, California.

Referring again to FIG. 4A, the computing device 400 may support any suitable installation device 416, such as a disk drive, a CD-ROM drive, a CD-R/RW drive, a DVD-ROM drive, a flash memory drive, tape drives of various formats, USB device, hard-drive, a network interface, or any other device suitable for installing software and programs. The computing device 400 may further include a storage device, such as one or more hard disk drives or redundant arrays of independent disks, for storing an operating system and other related software, and for storing application software programs such as any program or software 420 for implementing (e.g., configured and/or designed for) the systems and methods described herein. Optionally, any of the installation devices 416 could also be used as the storage device. Additionally, the operating system and the software can be run from a bootable medium.

Furthermore, the computing device 400 may include a network interface 418 to interface to the network 404 through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, IEEE 802.11n, IEEE 802.11ac, IEEE 802.11ad, CDMA, GSM, WiMax and direct asynchronous connections). In one embodiment, the computing device 400 communicates with other computing devices 400' via any type and/or form of gateway or tunneling protocol such as Secure Socket Layer (SSL) or Transport Layer Security (TLS). The network interface 418 may include a built-in network adapter, network interface card, PCMCIA network card, card bus network adapter, wireless network adapter, USB network adapter, modem or any other device suitable for interfacing the computing device 400 to any type of network capable of communication and performing the operations described herein.

In some embodiments, the computing device 400 may include or be connected to one or more display devices 424*a*-424*n*. As such, any of the I/O devices 430*a*-430*n* and/or the I/O controller 423 may include any type and/or form of suitable hardware, software, or combination of hardware and software to support, enable or provide for the connection and use of the display device(s) 424*a*-424*n* by the computing device 400. For example, the computing device 400 may include any type and/or form of video adapter, video card, driver, and/or library to interface, communicate, connect or otherwise use the display device(s) 424*a*-424*n*. In one embodiment, a video adapter may include multiple connectors to interface to the display device(s) 424*a*-424*n*. In other embodiments, the computing device 400 may include multiple video adapters, with each video adapter connected to the display device(s) 424*a*-424*n*. In some embodiments, any portion of the operating system of the computing device 400 may be configured for using multiple displays 424*a*-424*n*. One ordinarily skilled in the art will recognize and appreciate the various ways and embodiments that a computing device 400 may be configured to have one or more display devices 424*a*-424*n*.

In further embodiments, an I/O device 430 may be a bridge between the system bus 450 and an external communication bus, such as a USB bus, an Apple Desktop Bus, an RS-232 serial connection, a SCSI bus, a FireWire bus, a Fire Wire 800 bus, an Ethernet bus, an AppleTalk bus, a Gigabit Ethernet bus, an Asynchronous Transfer Mode bus, a FibreChannel bus, a Serial Attached small computer system interface bus, a USB connection, or a HDMI bus.

A computing device 400 of the sort depicted in FIGS. 4A and 4B may operate under the control of an operating system, which control scheduling of tasks and access to system resources. The computing device 400 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: Android, produced by Google Inc.; WINDOWS 7 and 8, produced by Microsoft Corporation of Redmond, Washington; MAC OS, produced by Apple Computer of Cupertino, California; WebOS, produced by Research In Motion (RIM); OS/2, produced by International Business Machines of Armonk, New York; and Linux, a freely-available operating system distributed by Caldera Corp. of Salt Lake City, Utah, or any type and/or form of a Unix operating system, among others.

The computer system 400 can be any workstation, telephone, desktop computer, laptop or notebook computer, server, handheld computer, mobile telephone or other portable telecommunications device, media playing device, a gaming system, mobile computing device, or any other type and/or form of computing, telecommunications or media device that is capable of communication. The computer system 400 has sufficient processor power and memory capacity to perform the operations described herein.

In some embodiments, the computing device 400 may have different processors, operating systems, and input devices consistent with the device. For example, in one embodiment, the computing device 400 is a smart phone, mobile device, tablet or personal digital assistant. In still other embodiments, the computing device 400 is an Android-based mobile device, an iPhone smart phone manufactured by Apple Computer of Cupertino, California, or a Blackberry or WebOS-based handheld device or smart phone, such as the devices manufactured by Research In Motion Limited. Moreover, the computing device 400 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

Although the disclosure may reference one or more "users", such "users" may refer to user-associated devices or stations (STAs), for example, consistent with the terms "user" and "multi-user" typically used in the context of a multi-user multiple-input and multiple-output (MU-MIMO) environment.

Although examples of communications systems described above may include devices and APs operating according to an 802.11 standard, it should be understood that embodiments of the systems and methods described can operate according to other standards and use wireless communications devices other than devices configured as devices and APs. For example, multiple-unit communication interfaces associated with cellular networks, satellite communications, vehicle communication networks, and other non-802.11 wireless networks can utilize the systems and methods described herein to achieve improved overall capacity and/or link quality without departing from the scope of the systems and methods described herein.

It should be noted that certain passages of this disclosure may reference terms such as "first" and "second" in connection with devices, mode of operation, transmit chains, antennas, etc., for purposes of identifying or differentiating one from another or from others. These terms are not intended to merely relate entities (e.g., a first device and a second device) temporally or according to a sequence, although in some cases, these entities may include such a relationship. Nor do these terms limit the number of possible entities (e.g., devices) that may operate within a system or environment.

It should be understood that the systems described above may provide multiple ones of any or each of those components and these components may be provided on either a standalone machine or, in some embodiments, on multiple machines in a distributed system. In addition, the systems and methods described above may be provided as one or more computer-readable programs or executable instructions embodied on or in one or more articles of manufacture. The article of manufacture may be a floppy disk, a hard disk, a CD-ROM, a flash memory card, a PROM, a RAM, a ROM, or a magnetic tape. In general, the computer-readable programs may be implemented in any programming language, such as LISP, PERL, C, C++, C#, PROLOG, or in any byte code language such as JAVA. The software programs or executable instructions may be stored on or in one or more articles of manufacture as object code.

While the foregoing written description of the methods and systems enables one of ordinary skill to make and use what is considered presently to be the best mode thereof, those of ordinary skill will understand and appreciate the existence of variations, combinations, and equivalents of the specific embodiment, method, and examples herein. The present methods and systems should therefore not be limited by the above described embodiments, methods, and examples, but by all embodiments and methods within the scope and spirit of the disclosure.

We claim:

1. A method for unstructured and structured data-driven classification, comprising:

receiving, by a computer system, a first set of structured data comprising a plurality of data values having corresponding metadata, and a second set of unstructured data comprising a second plurality of data values lacking corresponding metadata, wherein one or more data values of the first set of structured data and one or more data values of the second set of unstructured data are associated with the same unique identifier of a plurality of unique identifiers;

determining, by the computer system, a score for each unique identifier based on the associated structured data and unstructured data; and classifying, by the computer system, each unique identifier as belonging to (i) a first subset based on the respective score being below a first threshold, (ii) a second subset based on the respective score being above the first threshold and below a second threshold, or (iii) a third subset based on the respective score being above the second threshold.

2. The method of claim 1, further comprising:

associating, by the computer system, one or more data values of the second set of unstructured data with metadata based on a correlation between said data value, the associated unique identifier, and one or more data values and metadata of the first set of structured data also associated with the unique identifier.

3. The method of claim 2, wherein the one or more data values of the second set of unstructured data associated with metadata are considered structured data while determining the score for each unique identifier.

4. The method of claim 2, wherein associating the one or more data values of the second set of unstructured data with metadata further comprises selecting corresponding metadata, by a machine learning engine executed by the computer system, the machine learning engine trained on structured data and associated metadata.

5. The method of claim 1, further comprising, for each unique identifier classified as belonging to the second subset, identifying a modification to the associated structured or unstructured data that would increase the score to above the second threshold.

6. The method of claim 5, wherein a first unique identifier is classified as belonging to the second subset; and further comprising identifying, by the computer system, that associating a first item of unstructured data with metadata would increase the score for the first unique identifier to above the second threshold.

7. The method of claim 1, wherein determining a score for each unique identifier based on the associated structured data and unstructured data further comprises adjusting the score proportional to a ratio of structured data to unstructured data associated with the unique identifier.

8. The method of claim 1, wherein determining a score for each unique identifier based on the associated structured data and unstructured data further comprises incrementing the score based on a number of items of structured data associated with the unique identifier, or decrementing the score based on a number of items of unstructured data associated with the unique identifier.

9. The method of claim 1, wherein the metadata comprises an intermediate score, and wherein determining a score for each unique identifier further comprises aggregating the intermediate scores of the metadata of the structured data associated with the unique identifier.

10. The method of claim 9, wherein a first intermediate score of a first metadata of structured data is different from a second intermediate score of a second metadata of structured data.

11. A system for unstructured and structured data-driven classification, comprising:

a computer system comprising one or more processors and one or more memory devices;

wherein the one or more processors are configured to:

retrieve, from the one or more memory devices, a first set of structured data comprising a plurality of data values having corresponding metadata, and a second set of unstructured data comprising a second plurality of data values lacking corresponding metadata, wherein one or more data values of the first set of structured data and one or more data values of the second set of unstructured data are associated with the same unique identifier of a plurality of unique identifiers, determine a score for each unique identifier based on the associated structured data and unstructured data, and classify each unique identifier as belonging to (i) a first subset based on the respective score being below a first threshold, (ii) a second subset based on the respective score being above the first threshold and below a second threshold, or (iii) a third subset based on the respective score being above the second threshold.

12. The system of claim 11, wherein the one or more processors are further configured to:

associate one or more data values of the second set of unstructured data with metadata based on a correlation between said data value, the associated unique identifier, and one or more data values and metadata of the first set of structured data also associated with the unique identifier.

13. The system of claim 12, wherein the one or more data values of the second set of unstructured data associated with metadata are considered structured data while determining the score for each unique identifier.

14. The system of claim 12, wherein the one or more processors are further configured to execute a machine learning engine trained on structured data and associated metadata to select corresponding metadata to associate with the one or more data values of the second set of unstructured data.

15. The system of claim 11, wherein the one or more processors are further configured to, for each unique identifier classified as belonging to the second subset, identify a modification to the associated structured or unstructured data that would increase the score to above the second threshold.

16. The system of claim 15, wherein a first unique identifier is classified as belonging to the second subset; and wherein the one or more processors are further configured to identify that associating a first item of unstructured data with metadata would increase the score for the first unique identifier to above the second threshold.

17. The system of claim 11, wherein the one or more processors are further configured to adjust the score proportional to a ratio of structured data to unstructured data associated with the unique identifier.

18. The system of claim 11, wherein the one or more processors are further configured to increment the score based on a number of items of structured data associated with the unique identifier, or decrement the score based on a number of items of unstructured data associated with the unique identifier.

19. The system of claim 11, wherein the metadata comprises an intermediate score, and wherein the one or more processors are further configured to aggregate the intermediate scores of the metadata of the structured data associated with the unique identifier.

20. The system of claim 19, wherein a first intermediate score of a first metadata of structured data is different from a second intermediate score of a second metadata of structured data.

* * * * *